Sept. 14, 1948.  A. H. LAMB  2,449,304
SUPERVISORY ELECTRICAL ALARM SYSTEM
Filed May 16, 1946
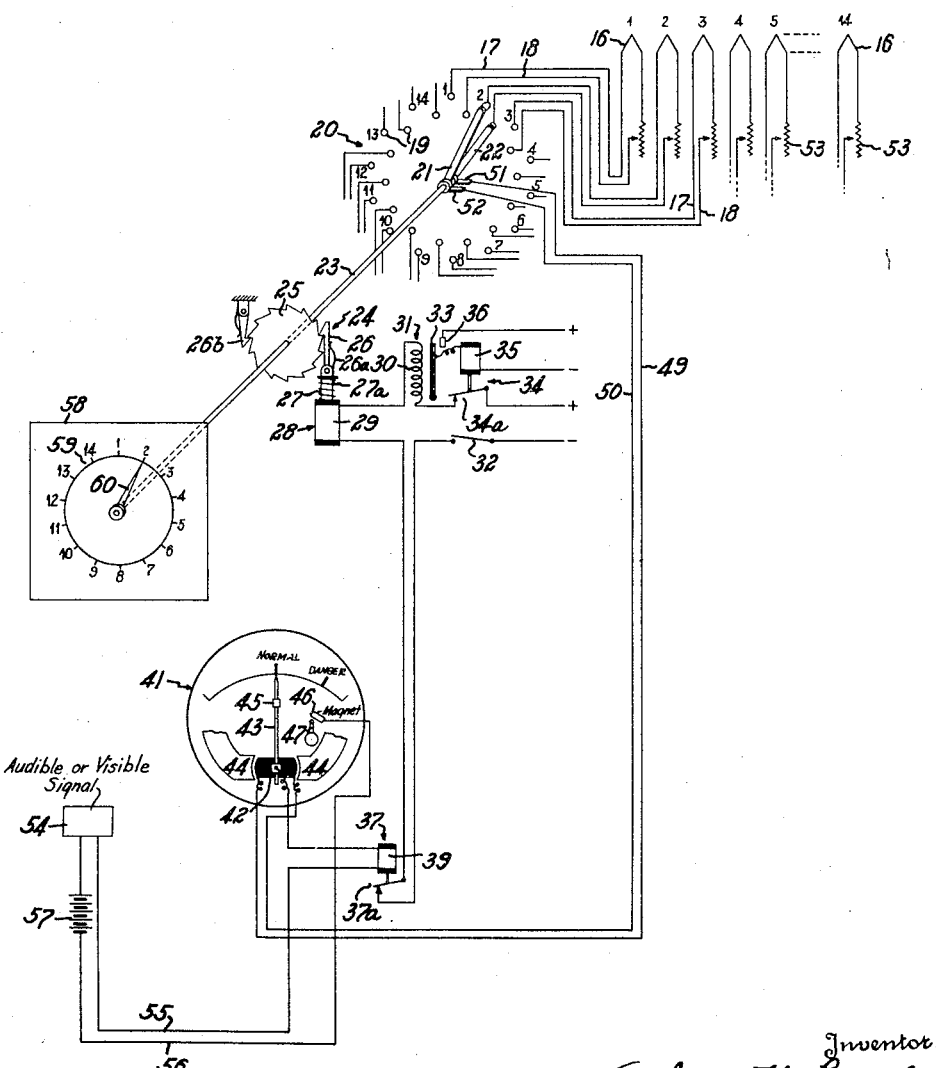
Inventor:
Anthony H. Lamb,
By Pierce & Scheffler,
Attorneys.

Patented Sept. 14, 1948

2,449,304

UNITED STATES PATENT OFFICE 2,449,304

SUPERVISORY ELECTRICAL ALARM SYSTEM

Anthony H. Lamb, Hillside, N. J., assignor to Weston Electrical Instrument Corporation, Newark, N. J., a corporation of New Jersey Application May 16, 1946, Serial No. 670,076

1 Claim. (Cl. 177—311)

This invention relates to an electrically operated alarm and particularly to a novel alarm system in which an alarm is sounded or otherwise raised whenever any one of a plurality of conditions under supervision reaches a critical value or magnitude.

The general object of the invention is to provide an alarm system of the class described that includes a selector mechanism by which each of a plurality of conditions can be checked in sequence, the operation of the system being such that should any one of the conditions be at a critical point at the time that it is checked, an alarm will be raised and further motion of the selector mechanism prevented. The operator will then know that one of the conditions under supervision has reached a critical value and also will be able to instantly identify that particular condition by reference to the stopped position of the condition selector mechanism, or by reference to suitable indicating apparatus connected for operation conjointly therewith.

A more particular object is to provide an alarm apparatus of the type described which includes a motorized selector switch that connects a condition determinative device at each of the conditions in succession to a single condition measuring instrument, the latter being provided with control mechanism actuated in accordance with the moving system of the instrument in such manner that whenever one of the conditions reaches a predetermined critical point, an alarm is raised and the selector switch stopped.

These and other objects and advantages will become more apparent from the following detailed description and from the drawing, the single figure of which is a diagrammatical view of one embodiment of an alarm system incorporating the invention as applied to apparatus for measuring, in succession, a plurality of related temperature conditions such as the temperature of each cylinder of an aircraft engine.

In general, the apparatus illustrated includes a master motorized selector switch which normally functions to periodically connect the several temperature-responsive devices associated with the cylinders in succession to a single temperature measuring instrument. The arrangement is such that each measurement made by the instrument causes the pointer or other type indicator element thereof to move to a "normal" position when the temperature of all the cylinders is normal. However, should the temperature of one of the cylinders become abnormal, e. g. rise to a preselected danger point, the instrument pointer closes a circuit which operates to sound or otherwise give an alarm to the operator and simultaneously stop the master selector switch at this point, from which the operator can instantly identify the overheated cylinder.

Referring now to the drawing, each of the cylinders of the aircraft engine (not shown) is provided with a thermocouple 16 which is disposed in heat exchange relation with the cylinder wall to measure the temperature thereof. Each thermocouple is connected via conductors 17, 18 to a set of fixed contacts 19 of a multi-contact set rotary selector switch 20 which is provided with a pair of contact arms 21, 22 mounted on a shaft 23 that is rotated by means of a step-by-step magnetic motor 24.

Motor 24 is comprised of a ratchet wheel 25 that is mounted on and keyed to shaft 23, and contains the same number of teeth as there are sets of contacts 19 on switch 20. A pawl 26 for actuating the ratchet wheel 25 is normally held engaged with a tooth on wheel 25 by leaf spring 26a. Pawl 26 is pivotally mounted on armature 27 of an electromagnet 28 and the armature is maintained in an elevated position by coil spring 27a. The operating coil 29 of electromagnet 28 is connected to a source of power indicated by conventional symbols through a control circuit which includes the heating coil 30 of a bimetallic switch 31, a manually operable switch 32 and contacts of relays 34 and 37.

Relay 34 has its energizing winding 35 connected to a source of power in a circuit which is completed whenever the movable bimetal strip 33 is heated and moves over into engagement with fixed contact 36. Each time that relay 34 is energized, its contacts 34a are opened, and the circuit to the coil 29 of electromagnet 28, which also includes the heating coil 30 of bimetallic switch 31, is opened.

Assuming now for the present that the contacts 37a of relay 37 are closed, it will be evident that the bimetallic switch 31 and relay 34 constitute a time delay control for effecting periodic energization and deenergization of the coil 29 of magnet 28. With relay contacts 34a closed (the position shown in the drawing), coil 29 will be energized to draw armature 27 and pawl 26 downwardly against spring 27a to rotate ratchet wheel 25 and shaft 23 by an amount sufficient to cause the contactor arms 21, 22 of selector switch 20 to be stepped from one set of fixed contacts 19 to the next adjacent contact set. Relay winding 29 remains energized until coil 30 has heated bimetallic strip 33 sufficiently to cause it to move over and engage fixed contact 36 whereupon winding 35 of relay 34 becomes energized and opens the contacts 34a of this relay. When this happens, the circuit to magnet coil 29 and heating coil 30 is interrupted and pawl 26 moves back to its elevated position and engages the next tooth on wheel 25. It is then ready to be pulled down and rotate ratchet wheel 25 again as soon as the bimetallic strip 33 has cooled sufficiently to break engagement with fixed contact 36, which interrupts current to the winding 35 of relay 34, causing the contacts 34a of this relay to close once again and reestablish the circuit for energizing the coil 29 of magnet 28.

To prevent any possible reversed rotation of shaft 23 as pawl 26 rides up a tooth side on wheel 25, a spring pressed pawl 26b may be pivotally supported for engagement with ratchet wheel 25 on the side opposite pawl 26.

It is thus now evident that the magnetic motor 24 which is comprised of ratchet wheel 25 and periodically energized electromagnet 28 function to rotate the shaft 23 and switch arms 21, 22 in a step-by-step manner for contact successively with the several sets of fixed contacts 19 of selector switch 20.

For measuring the temperature of the thermocouples 16, a single instrument 41 is used. This instrument includes a moving system comprising a coil 42 with pointer 43 attached that is mounted for rotation within a magnetic field set up across magnet poles 44. Pointer 43 carries a rider 45 of magnetic material such as soft iron which is adapted for engagement with a small permanent magnet contact 46 whenever the current through the coil 42 of the moving system is sufficient to cause the pointer 43 to move far enough to the right for rider 45 to be attracted by the permanent magnet 46. Once rider 45 has been attracted to magnet 46, it remains firmly in contact therewith, irrespective of subsequent changes in current through coil 42, until manually released by rotating a small lever 47 that pushes against pointer 43 to separate rider 45 and magnet 46.

Contact arms 21, 22 of the selector switch are connected by conductors 49, 50 and slip rings 51, 52 to the coil 42 of instrument 41. Hence during the comparatively brief periods that arms 21, 22 dwell on each pair of the contacts 19, the instrument 41 is connected in succession to the several thermocouples 16.

Adjustable resistors 53 are preferably connected in the circuit lines 17, 18 from the several condition-responsive devices for individual adjustment to provide a preselected current input to the measuring instrument coil 42 when the particular measured condition reaches an abnormal value that is or may be dangerous. These calibrating resistors are not essential when all of the condition-responsive devices are of the same character and respond in the same sense and degree to abnormal conditions, but the calibrating resistors are essential when, as will be described later, the condition-responsive devices are of different characters and/or exposed to different conditions.

It has been previously explained that when the temperature of any one of the cylinders as measured by thermo-couples 16 and instrument 41 rises to a danger point, an alarm should be signalled and rotation of the selector switch arms 21, 22 stopped so that the supervisor will know that one of the cylinders has overheated and will be able instantly to identify the overheated cylinder. For accomplishing this, an electrically operated audible or visible signal 54 is connected in a relay circuit which includes the contacts 45, 46 of the measuring instrument 41, and the winding 39 of the relay 37. As shown, the alarm device 54 is connected to the winding 37 by a lead 55, the other terminal of winding 37 going to the contact arm 43 and contact 45 of the instrument. The circuit to the alarm device is completed through lead 56 from the instrument contact 46 and a current source which is shown diagrammatically as a battery 57. In the event of an abnormal condition which results in a closure of the instrument contacts 45, 46, the relay circuit is energized to actuate the signal device 54 and simultaneously to interrupt the stepping movement of the motor 24 when relay 37 pulls in to open contacts 37a of the motor-energizing circuit. In other words, switch arms 21, 22 are stopped on the contact set 19 in circuit with the thermocouple 16 of the overheated engine cylinder. By applying identifying engine cylinder indicia to the contact sets 19, the operator will then know which cylinder is overheated. If desired, a separate engine cylinder indicator instrument 58 may be used which, as shown, comprises a scale 59 bearing numerals 1 to 14 (there being fourteen cylinders in the engine) and a pointer 60 which is rotated by shaft 23.

The scale of the instrument 41 may be calibrated in absolute values when all of the condition-responsive devices are of the same character and are exposed to conditions of the same order of magnitude. The invention is not limited to such systems however as the calibrating resistors 53 permits the incorporation in one alarm system of various forms of condition responsive devices which normally develop currents of different orders of magnitude. For example, one or more of the thermocouples 16 may be located in the baggage compartment or other closed compartment of an aircraft as elements of a fire alarm system. The critical danger temperature for the fire alarm system may be substantially different from the critical danger temperature for the engine cylinders, and the individual calibrating resistors 53 thus constitute means for adjusting the "danger" current of the several thermocouples to a preselected value. Other temperature measuring systems may be employed, for example resistor bulbs for measuring the temperature at the inlet manifold of the aircraft engine. In a mixed system of thermocouples and resistor bulbs for temperature measurements, the same critical current value corresponding to a danger condition may be delivered to the measuring instrument through an appropriate adjustment of the calibrating resistors 53.

Furthermore, some of the condition-responsive devices may respond to temperature, as shown and described, and other devices respond to pressure or to the liquid level in a fuel tank. There is no limitation upon the types of condition-responsive devices that may be included in an alarm system since the resistors 53 may be adjusted to calibrate the measuring instrument 41 on the arbitrary scale of "normal" and "abnormal" operating conditions. Various factors of the same or different characters may thus be checked by a single instrument and its associated alarm system.

While one type of electro-responsive device may be required for one of the conditions and a different type with different electrical characteristics required for another of the conditions, all of the electro-responsive devices may be connected into the same alarm system simply by arranging known electric regulating devices in the circuit of each device in such manner that currents of the same relative magnitude and range are applied to the moving system of the instrument.

Having thus fully described my invention, what I claim is:

In an electric alarm system for supervising a plurality of variable conditions; a signal circuit for each condition, each said circuit including an electric device having a characteristic which varies with the magnitude of said condition and an adjustable impedance for conforming the variable characteristics of all said devices to a common range; an electrical measuring instrument including cooperative stationary and pointer carried contacts one of which is magnetic, a manually actuated release for said contacts and a scale identifying a "normal" and "danger" pointer displacement; a motor driven selector switch arranged to connect said signal circuits in succession to said instrument; a signal device; circuit means operative upon a closure of said contacts to actuate said signal device and stop said selector switch; and an indicator driven by said selector switch for identifying each of the supervised conditions.

ANTHONY H. LAMB.

REFERENCES CITED

The following references are of record in the file of this patent:

UNITED STATES PATENTS

| Number | Name | Date |
|---|---|---|
| 1,443,165 | Brown | Jan. 23, 1923 |
| 2,407,361 | Wilson | Sept. 10, 1946 |

FOREIGN PATENTS

| Number | Country | Date |
|---|---|---|
| 502,711 | Great Britain | Mar. 23, 1939 |